(12) United States Patent
Dartez

(10) Patent No.: US 9,260,333 B2
(45) Date of Patent: Feb. 16, 2016

(54) DEICING SYSTEM FOR AERATOR

(71) Applicant: James Dartez, New Orleans, LA (US)

(72) Inventor: James Dartez, New Orleans, LA (US)

( * ) Notice: Subject to any disclaimer, the term of this patent is extended or adjusted under 35 U.S.C. 154(b) by 344 days.

(21) Appl. No.: 13/927,342

(22) Filed: Jun. 26, 2013

(65) Prior Publication Data

US 2015/0001743 A1 Jan. 1, 2015

(51) Int. Cl.
*C02F 7/00* (2006.01)
*A01K 63/04* (2006.01)
*B01F 3/04* (2006.01)

(52) U.S. Cl.
CPC ............... *C02F 7/00* (2013.01); *A01K 63/042* (2013.01); *B01F 3/04262* (2013.01); *B01F 2003/04319* (2013.01); *Y02W 10/15* (2015.05)

(58) Field of Classification Search
CPC .................................................. B01F 3/04113
See application file for complete search history.

(56) References Cited

U.S. PATENT DOCUMENTS

| | | | | |
|---|---|---|---|---|
| 5,223,130 A * | 6/1993 | Valfrido | ................ | A01K 63/04 210/170.02 |
| 5,441,640 A * | 8/1995 | Baxter | ................ | C02F 3/1263 210/195.3 |
| 7,622,040 B2 * | 11/2009 | Mitchell | ............ | B01F 3/04262 210/170.05 |
| 8,016,273 B1 * | 9/2011 | Dartez | ............... | B01F 3/04113 261/120 |

* cited by examiner

*Primary Examiner* — Duane Smith
*Assistant Examiner* — Adam Bergfelder
(74) *Attorney, Agent, or Firm* — Roy Kiesel Ford Doody & Thurmon

(57) ABSTRACT

An anti-icing apparatus for use with an aerator or other in-water device is disclosed. The anti-icing apparatus uses perforated tubes to introduce ambient air into a body of liquid. Anti-icing tubes are positioned near the lower periphery of the sides of the aerator housing. A blower is used to supply ambient air to the anti-icing tubes. The anti-icing tubes produce a blanket of air bubbles around the housing and thus prevent the formation of ice around the aerator. The anti-icing apparatus may be used to protect various devices that must remain in a body of water during sustained periods of below-freezing temperatures.

11 Claims, 3 Drawing Sheets

DEICING SYSTEM FOR AERATOR

BACKGROUND OF THE INVENTION

1. Field of the Invention

This invention relates to an anti-icing apparatus for use with devices that must remain in a body of water during sustained periods of below-freezing temperatures. In a preferred embodiment, the anti-icing apparatus is deployed with an aerator located in a pond or other body of water subject to possible freezing conditions.

2. Description of Related Art

A variety of devices are used in ponds or other bodies of water. In-pond aerators are one example of such a device, and in-pond aerators have been used in a variety of contexts. The terms "in-pond aerator" are used herein to refer to any aerator positioned within a body of water, whether the body of water is technically a pond or other type of reservoir. Thus, an in-pond aerator is any type of aerator positioned in any body of water to aerator the water.

In-pond aerators are often used in aquaculture, for example, to oxygenate the water body in order to provide optimum conditions for the fish or other living organisms being produced. Without aeration, many small to mid-sized bodies of water become stagnant, with low dissolved oxygen levels, increasing amounts of sludge build-up, and other related problems. These poor conditions can lead to a variety of problems, including fish kills, emissions of undesirable gases and odors, and an accumulation of sludge. Aerators of many kinds have been used to introduce oxygen into such bodies of water.

An improved aerator is disclosed and claimed in U.S. Pat. No. 8,016,273 to Dartez (the '273 patent). The '273 patent is hereby incorporated by reference, and the aerator design disclosed in the '273 patent is the starting point for a preferred embodiment of the present invention. That is, the present invention adds anti-icing structure to the improved aerator design disclosed in the '273 patent. This additional structure provides important benefits.

The aerator disclosed in the '273 patent does more than just oxygenate water. The improved aerator disclosed in the '273 patent creates flow within the body of water. It lifts water from the lower levels of the pond or other body of water, moves this water through the aerator housing, while infusing air into the water. This process not only aerates the water, it also turns over the water, effectively moving the lower water to the surface. In operation, the improved aerator of the '273 patent can turn over and circulate substantially all the water in a small to mid-sized pond or other body of water without the need for any additional equipment. Indeed, in most small to mid-sized bodies of water, the improved aerator disclosed in the '273 patent can accomplish this task without being moved around the water body. The aerator creates sufficient turnover and circulation that substantially all the water will be recirculated and oxygenated over time.

This combined turnover and aeration provide benefits in many contexts. Smaller bodies of water that might otherwise become stagnant, remain healthy and relatively free of sludge. Aquaculture ponds are oxygenated and the dissolved oxygen is distributed relatively uniformly throughout the pond. Sanitation and water recovery systems can use the improved aerator to make their operations more efficient.

To obtain these benefits, however, it is often necessary to operate the improved aerator during period of prolonged cold weather. When the temperature remains below the freezing point for substantial periods of time (e.g., for several days or more), the surface of small to mid-sized bodies of water will begin to freeze. A solid sheet of ice may form, or numerous large pieces of ice may form. When the temperatures remain low enough for long enough, several inches near the upper surface of the body of water will freeze.

Water expands as it freezes, and the expansion of an ice sheet on the surface of a body of water can exert great forces on objects within the water. This fact requires steps to prevent the formation of ice around such objects, to break up ice as it forms, or to remove the objects from the body of water before damage occurs. If an object must remain in the water for operational reasons (e.g., if an aerator is needed even during periods with sub-freezing temperatures), some means is needed to protect the object for damage that could result from the expanding ice sheet on the surface of the body of water.

It has been discovered that the improved aerator disclosed in the '273 patent generates sufficient turbulence in the water near the outlet side of the aerator to prevent the formation of ice in this region. The present invention incorporates certain components of the improved aerator and uses those components in a novel manner to prevent icing around the other three sides of the aerator. The aerator of the '273 patent has four sides, with one side being the outlet of the aerator. The three remaining sides have relatively large surface areas, typically covered by relatively thin, light-weight material (e.g., galvanized sheet metal or the like are commonly used). These structures are not built for strength and are, for that reason, particularly vulnerable to ice damage.

The remaining three sides of the aerator housing, however, remain largely unprotected. During normal operations, the water surrounding these three sides of the aerator housing is prone to icing when long periods of below-freezing temperatures occur. The water surrounding the three non-exit sides of the improved aerator does move, because the aerator tends to pull water in from these directions. But the majority of the water pulled into the aerator comes from below the aerator, thus leaving the surface of the water mostly undisturbed on the three non-exit sides of the housing.

Other devices also may be used in long-term, sub-freezing conditions. For examples, other types of aerators would be subject to similar forces if used in ponds or other bodies of water during prolonged periods of sub-freezing temperatures. Pumps, large valves, and other objects also may be used in such bodies of water during icing conditions. Water sampling or monitoring equipment and even barges, boats, and other watercraft are often subject to ice damage.

A means of protecting such objects from ice damage is needed. A low-cost, simple device is desirable. Because many aerators and other devices have electrical power, a device that runs on electricity would be particularly suitable for many applications. The present invention provides such a solution to these problems.

OBJECTS AND SUMMARY OF THE INVENTION

It is an object of the invention to provide an anti-icing structure to objects positioned in bodies of water that are subject to freezing so that such objects may be operated during prolonged periods of subfreezing temperatures. The present invention employs a blower, ducts, connections, and bubbling tubing. The blower is connected to ducts, which route the output of the blower to the bubbling tubing, which is installed below the waterline of the protected object. The bubbling tubing is arranged around all vulnerable sides of the object.

The precise arrangement of the anti-icing bubbling tubing depends on the design of the protected object. With an aerator of the type disclosed in the '273 patent, three sides of the aerator housing are vulnerable to ice damage. One side of the '273 patent aerator is the aerator output, and that side is filled with a large stream of bubbles in operation. Those bubbles and the water flowing with those bubbles prevent icing on the output side of the aerator. The three remaining sides of the housing, however, are unprotected. The anti-icing bubbling tubing of the present invention is arranged around the three unprotected sides of the aerator. In use, the anti-icing blower supplies a large volume of air to the anti-icing bubbling tubing, resulting in a blanket of bubbles around the three vulnerable sides of the aerator housing. This blanket of bubbles prevents icing and thus protects the aerator from damage.

With other aerator designs and other types of protected objects, the anti-icing bubbling tubing may be arranged differently. If, for example, an object has active water movement on two sides, then the present invention would employ its anti-icing bubbling tubing only on the other two sides. That is, the anti-icing bubbling tubing would be used only on the sides of the object that otherwise lack water movement.

It is a further object of the invention to provide a simple, low-cost anti-icing system for water body aerators, and in particular, for aerators of the design disclosed in the '273 patent. It is yet another object of the invention to provide an anti-icing system for water body aerators that may be installed as a simple retrofit on existing aerators of varying designs.

In a preferred embodiment, the present invention includes an anti-icing apparatus for use with an object positioned in a body of water subjected to prolonged periods of sub-freezing temperatures, having an anti-icing blower positioned on an upper surface of a housing of the object; anti-icing bubbling tubing extending along at least a majority of the perimeter of at least two sides of the object, wherein the anti-icing bubbling tubing is positioned below the waterline when the object is in use; and, a duct extending from the anti-icing blower to the anti-icing bubbling tubing.

DETAILED DESCRIPTION OF THE INVENTION

Figure 1:
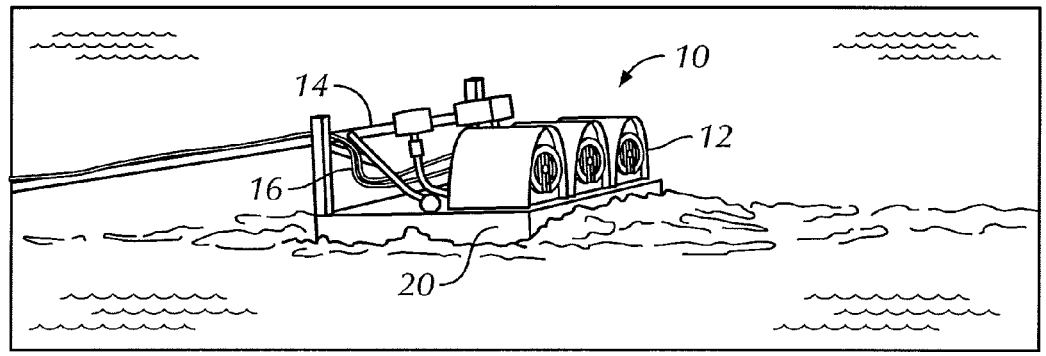
FIG. 1 is perspective view sketch of an embodiment of the present invention in use with an aerator of the type disclosed in the '273 patent.

The following description makes reference to the drawings and the item numbers shown in those drawings. FIG. 1 shows a sketch of an aerator 10 with the present invention. The aerator 10 has a series of blowers 12 that provide the needed airflow to the anti-icing bubbling tubing, and to primary aeration tubing. This aerator is of the general type disclosed in the '273 patent, though it is not intended to be limited to that design. It represents, in a general sense, any water-borne object with three sides that are vulnerable to ice damage. The aerator 10 has a tether 14 that is secured to the shore or to some other appropriate anchoring connection. Power cables 16 are typically routed along the tether 14 to an on-shore electrical power supply. Part of the aerator housing 20 is also shown in FIG. 1.

FIG. 1 shows that the water around all sides of the aerator 10 is turbulent. The output side of the housing is perhaps the most turbulent, because that area is the high bubble concentration and water flow described in the '273 patent. The water around the remaining three sides of the housing (only one other side and the back area are visible in FIG. 1) is turbulent due to bubbles released by the anti-icing bubbling tubing of the present invention.

Figure 2:
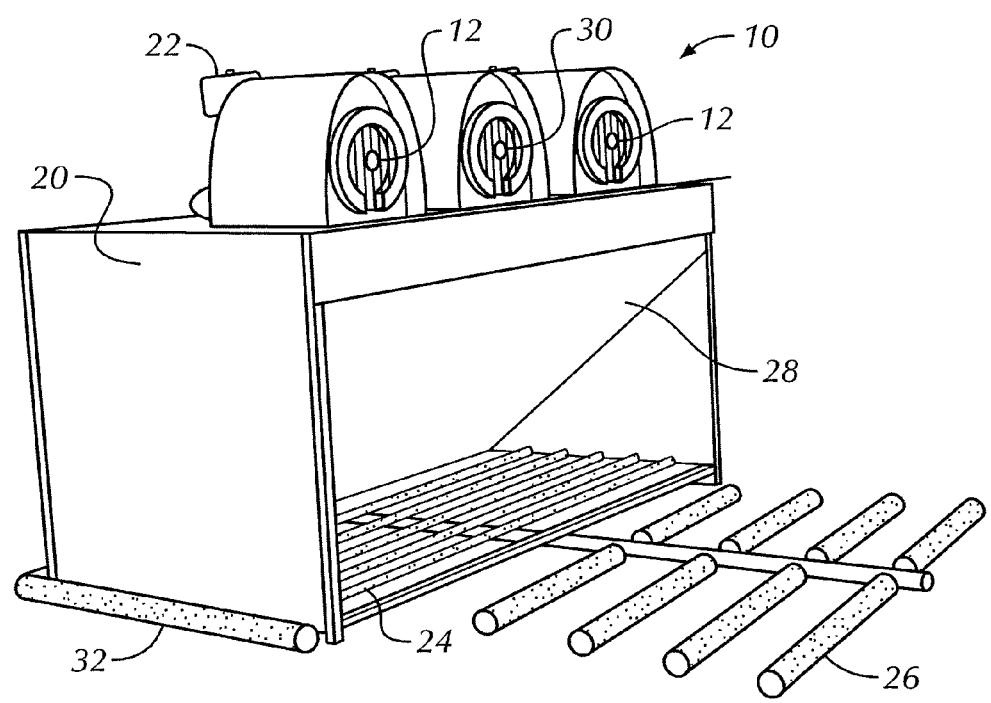
FIG. 2 is a perspective view of an embodiment of the present invention installed on an aerator of the type disclosed in the '273 patent.

FIG. 2 is a perspective view that illustrates the key components of the present invention. An aerator 10 of the general type disclosed in the '273 patent is shown. Three blowers are shown. Two primary blowers 12 provide the air flow to an inner bubbling grid 24 and an outer bubbling grid 26. The connections between the primary blowers 12 and the bubbling grids 24, 26 are not shown.

The bubbling grids 24 and 26 may produce fine or coarse bubbles, as is explained in the '273 patent's written description. The two bubbling grids may both produce the same type/size of bubbles, or one may produce fine and the other coarse bubbles. In a preferred embodiment, the inner bubbling grid 24 produces coarse bubbles, when tend to generate greater water flow through the aerator, which the outer bubbling grid 26 produces fine bubbles, which tend to better dissolve into the water. Positioning the fine bubbling grid entirely outside the housing is a preferred embodiment, and is shown in FIG. 2.

The anti-icing bubbling tubing 32 may be of the same type as the bubbling tubing used in the primary bubbling grids 24 and 26. In a preferred embodiment, the anti-icing bubbling tubing 32 is made of the same coarse bubbling tubing used on the inner bubbling grid 22, as described in the preceding paragraph. Therefore, in a most preferred embodiment, the inner bubbling grid 24 uses coarse bubbling tubing, the outer bubbling grid 26 uses fine bubbling tubing and is positioned entirely outside the housing, and the anti-icing bubbling tubing 32 uses coarse bubbling tubing that extends around most of the three vulnerable sides of the housing 20.

A third blower, an anti-icing blower 30 is shown in FIG. 2. This blower can be installed anywhere there is available space on the top surface of the housing 20. Anti-icing bubbling tubing 32 is shown along a lower edge of a side of the housing 20. The anti-icing tubing may be attached to the housing 20, or it may be held a distance away from the housing. This figure also shows air intakes 22 for the blowers. As shown, the intakes 22 are positioned relatively high to prevent water from entering the blowers. Additional features may be used to further reduce the risk of water entry into the blowers.

In a preferred embodiment, the invention uses the anti-icing blower 30 to supply air flow to the anti-icing bubbling tubing 32. This creates a blanket of bubbles along the surface of the housing 20. These bubbles create turbulence at surface of the water, and this turbulence prevents ice from forming. The anti-icing bubbling tubing 32 may be secured a distance outward from the housing 20, but the distance must be small enough that the blanket of bubbles effectively protects the exposed housing surface from damage caused by expanding ice.

Alternatively, the invention could use existing blowers to supply air to the anti-icing bubbling tubing 32. This structure would require some type of manifold and/or valve assembly to control the flow of air between the anti-icing bubbling tubing 32 and other diffuser tubing or other components of the device. Though this approach works, it may require rather precise settings on site by operators who are not fully familiar with the system. The preferred embodiment (i.e., having a dedicated anti-icing blower 30) allows for the setting of most flow rates before delivery, thus eliminating the need for the operator to deal with this issue.

It should be noted that ice may still form in the water near the protected object. The invention need not completely prevent the formation of ice. For example, small ice crystals or a small ridge or rim of ice may form without causing damage to the protected object. Ice damage is not caused by small bits of ice, but rather by the force exerted by a large, expanding sheet of ice. The present invention works by preventing such a large sheet of ice from reaching the sides of the protected object.

It may be preferably in some circumstances to position the anti-icing tubing 32 several inches or even more than one foot away from the outer surface of the protected object. This arrangement may allow a rim or ridge of ice to form around the point where the water contacts the housing, while also maintaining an ice-free region between the housing and the main ice sheet on the surface of the body of water. The best position for the anti-icing tubing 32 will vary and is best left to the judgment of operators who are knowledgeable about local conditions.

The anti-icing tubing 32 may be designed for attachment to the housing of the protected object at variable distances from the housing. For example, support shafts or rods (not shown) may extend outwardly from the housing on each of the vulnerable sides of the housing. The anti-icing tubing 32 may be designed for attachment to such support shafts or rods at various distances away from the housing. This arrangement can be as simple as using cable tie wraps or other similar means to secure the anti-icing tubing 32 to the support shafts or rods. This simple construction may not be suitable for long-term use or in other demanding conditions. More robust or permanent attachment means may be used when needed.

The anti-icing bubbling tubing 32 may be secured to a lower part of the housing 20 using a variety of means. Hose or tubing clamps may be used and then screwed or bolted into the housing. Pipe clamps may be used to hold the tubing a preselected distance away from the housing 20. The present invention is not dependent upon the means used to secure the anti-icing tubing 32 to the housing 20.

Figures 3A, 3B:
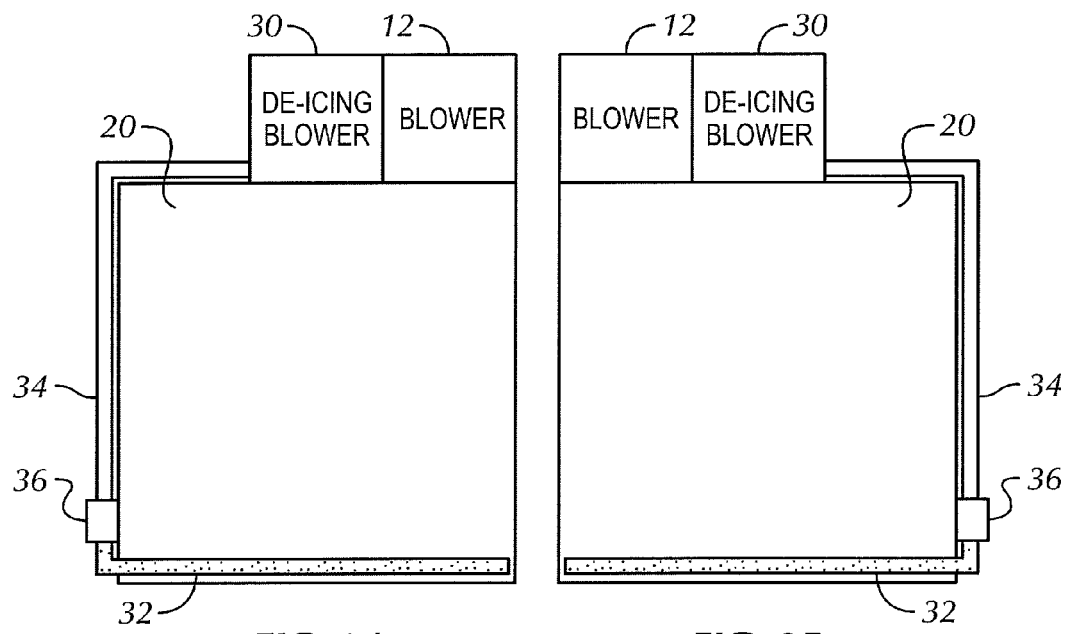
FIG. 3A is a right side view of an embodiment of the present invention.
FIG. 3B is a left side view of an embodiment of the present invention.

FIGS. 3A and 3B show opposite side views of a preferred embodiment of the invention. Each figure shows a primary blower 12 and an anti-icing blower 30 positioned on top of the housing 20. Anti-icing ducts 34 run from the anti-icing blower 30 to the anti-icing bubbling tubing 32. A union 36 is also shown, and such a fitting may be used to make the connection between the duct 34 and the bubbling tubing 32.

Though not shown in these figures, a shut off or throttling valve may be installed in the run of the duct 34 and used to either shut off or throttle the air flow to the bubbling tubing 32. Use of a throttling valve would allow a user to control the rate of bubble creation around the vulnerable sides of the housing 20, and thus produce enough bubbles to create sufficient turbulence while not unduly rocking or shaking the aerator.

Figure 4:
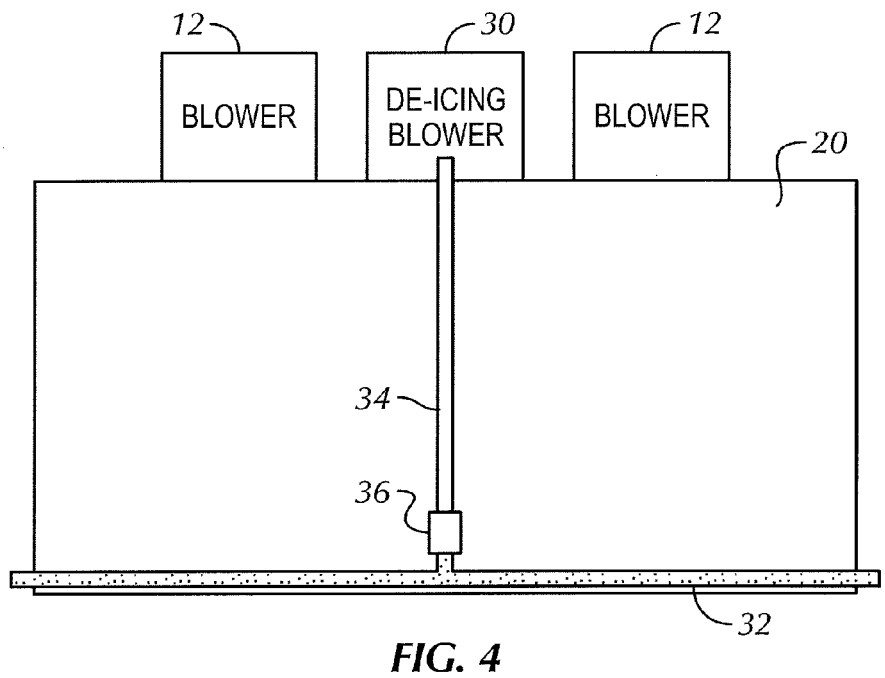
FIG. 4 is a back view of an embodiment of the present invention.
Figure 5:
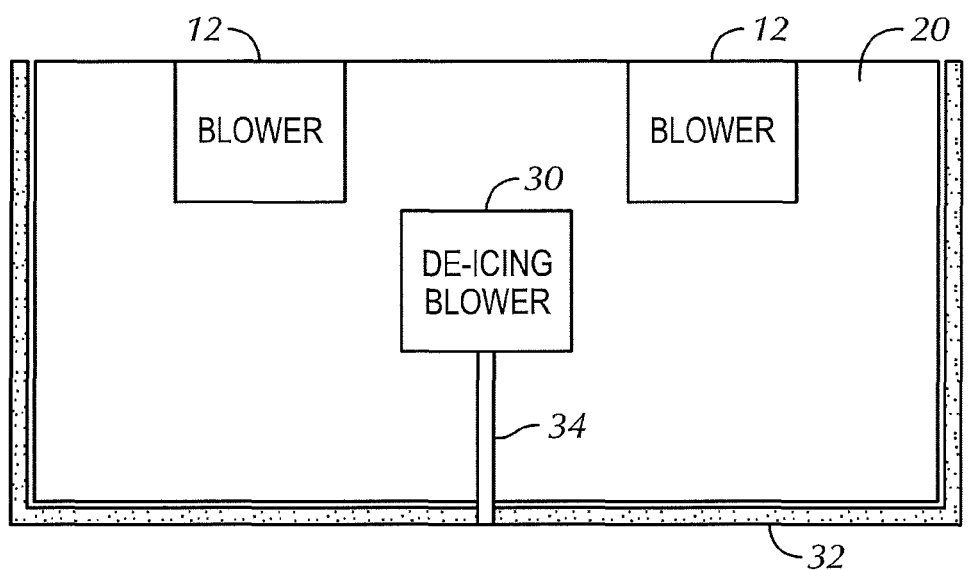
FIG. 5 is a top view of an embodiment of the present invention.

FIGS. 4 and 5 show back and top views of a preferred embodiment of the present invention. In FIG. 4, the primary blowers 12 and anti-icing blower 30 are shown, with the anti-icing blower connected to duct 34. A union 36 is shown as the connection between the duct 34 and the bubbling tubing 32.

FIG. 5 shows a top view, including again the primary blowers 12 and the anti-icing blower 30. The duct 34 and anti-icing tubing 32 are also shown. Because FIG. 5 is a top view, it is possible to see the anti-icing bubbling tubing 32 positioned around three sides of the housing 20.

The anti-icing bubbling tubing 32 may be of various forms. In a preferred embodiment, the bubbling tubing 32 is an air permeable tubing material that allows for uniform bubble creation along its length. Many specific types of such material are available, and most will perform adequately in the present invention, though some materials may work better in low-temperature environments. For example, some types of material become brittle and stiff at low temperatures and may be more vulnerable to damage or failure.

Alternatively, the bubbling tubing 32 may be rigid tubing material, such as PVC tubing, with small holes or slots to produce the desired bubbles. This arrangement may be less desirable because larger and less uniform bubbles may be produced, resulting in a less controlled turbulent region around the housing 20. On the other hand, using rigid bubbling tubing provides construction advantages and may provide a more durable and reliable apparatus.

A combination of rigid and non-rigid tubing also may be used. Sections of rigid tubing may be secured to the housing below the water line using any convenient attachment means (e.g., pipe clamps). Non-rigid, air permeable tubing may then be connected to the rigid tubing sections such that a substantial portion of the length of the side of the housing is covered by bubbles when the apparatus is in use.

By way of example, and using FIG. 5 for reference purposes, rigid tubing could be used at the back corners of the housing, at the point where the duct 34 connects to the bubbling tubing 32, and at the extreme ends of the bubbling tubing runs (i.e., at the front corners of the housing). These sections of rigid tubing could be easily secured to the housing 20 and then air permeable, non-rigid tubing may be connected to these sections of the rigid tubing. This combination provides ease of installation together with sufficient sections of air-permeable tubing to provide the needed anti-icing bubble blanket around the three vulnerable sides of the aerator housing 20.

The bubbling tubing 32 also may be constructed using flexible, air permeable tubing positioned over rigid tubing having relatively large holes or slots in it. For example, PVC tubing could be used along the entire length of the bubbling tubing run shown in FIG. 5. Relatively large holes or slots could be cut into certain sections of the rigid tubing, and those regions then covered with flexible, air permeable tubing. The ends of each piece of flexible, air permeable tubing could be secured to the rigid tubing using hose clamps or any other suitable means.

Other variations are also possible and are fully within the scope of the present disclosure. So long as sufficient lengths of bubbling tubing are positioned below the waterline along all vulnerable sides of the aerator housing or other protected object, the requirements of the present invention are met.

I claim:

1. An in-pond aerator, comprising:
   a. a housing configured to be positioned in a body of water such that an upper surface of the housing remains above the waterline when the aerator is in use, the housing further comprising a water inlet section and a water outlet section;
   b. a first generally horizontal grid of porous diffuser tubing positioned inside the housing;
   c. a second generally horizontal grid of porous diffuser tubing positioned outside of the housing;
   d. at least one blower connected to the first generally horizontal grid of porous diffuser tubing and to the second generally horizontal grid of porous diffuser tubing;
   e. anti-icing bubbling tubing extending along at least a majority of the perimeter of at least two sides of the aerator housing, wherein the anti-icing bubbling tubing is positioned at a point on the housing that is below the waterline when the aerator is in use; and, f. an anti-icing blower connected to the anti-icing bubbling tubing.

2. The aerator of claim 1, wherein the first generally horizontal grid of porous diffuser tubing comprises coarse-porous tubing.

3. The aerator of claim 2, wherein the coarse-porous diffuser tubing has a pore size in the range of about 1.5 mm to about 2.5 mm.

4. The aerator of claim 1, wherein the second generally horizontal grid of porous diffuser tubing comprises fine-porous tubing.

5. The aerator of claim 4 wherein the fine-porous diffuser tubing has a pore size in the range of about 0.5 mm to about 1.0 mm.

6. The aerator of claim 2, wherein the second generally horizontal grid of porous diffuser tubing comprises fine-porous tubing.

7. The aerator of claim 2 wherein the anti-icing bubbling tubing is constructed from the same type material used for the coarse-porous diffuser tubing.

8. The aerator of claim 1, wherein the housing is configured to float in a body of water.

9. The aerator of claim 1, wherein the housing further comprises a baffle plate to confine and direct the flow of water from the water inlet section to the water outlet section.

10. The aerator of claim 1 further comprising anti-icing bubbling tubing extending along at least a majority of the perimeter of three sides of the aerator housing.

11. An in-pond aerator, comprising:

a. a housing configured to be positioned in a body of water such that an upper surface of the housing remains above the waterline when the aerator is in use, the housing further comprising a water inlet section and a water outlet section;

b. a first generally horizontal grid of porous diffuser tubing positioned inside the housing;

c. a second generally horizontal grid of porous diffuser tubing positioned outside of the housing;

d. a first blower connected to the first generally horizontal grid of porous diffuser tubing;

e. a second blower connected to the second generally horizontal grid of porous diffuser tubing;

f. anti-icing bubbling tubing extending along at least a majority of the perimeter of at least two sides of the aerator housing, wherein the anti-icing bubbling tubing is positioned at a point on the housing that is below the waterline when the aerator is in use; and, g. an anti-icing blower connected to the anti-icing bubbling tubing.

* * * * *